(12) United States Patent
San Paolo et al.

(10) Patent No.: US 7,219,941 B1
(45) Date of Patent: May 22, 2007

(54) ENCLOSED STORAGE FOR TRUCKS

(75) Inventors: Marc San Paolo, Downey, CA (US); Carlos J. Aros, Bellflower, CA (US); Sylvan S. Throndson, Bellflower, CA (US); Eliseo Salcedo, Huntington Park, CA (US); Rogelio Gastelum, Downey, CA (US); Timothy Allan Cavanaugh, South Lyon, MI (US)

(73) Assignees: Royal Truck Bodies, Inc., Paramount, CA (US); General Motors Corporation, Detroit, MI (US)

( * ) Notice: Subject to any disclaimer, the term of this patent is extended or adjusted under 35 U.S.C. 154(b) by 146 days.

(21) Appl. No.: 11/002,815

(22) Filed: Dec. 1, 2004

Related U.S. Application Data

(60) Provisional application No. 60/527,267, filed on Dec. 5, 2003.

(51) Int. Cl.
  *B60R 9/06* (2006.01)
(52) U.S. Cl. .................................. 296/37.6; 224/404
(58) Field of Classification Search ............... 296/37.1, 296/24.3, 37.6; 224/538, 404
See application file for complete search history.

(56) References Cited

U.S. PATENT DOCUMENTS

| | | | |
|---|---|---|---|
| 4,861,096 A * | 8/1989 | Hastings | 296/183.1 |
| 4,917,430 A | 4/1990 | Lawrence | 296/376 |
| 5,102,180 A * | 4/1992 | Finley | 296/37.6 |
| 5,125,710 A * | 6/1992 | Gianelo | 296/37.1 |
| 5,188,414 A * | 2/1993 | Burnham et al. | 296/37.6 |
| 5,316,358 A * | 5/1994 | Payne et al. | 296/37.6 |
| 5,464,264 A * | 11/1995 | Wilson | 296/37.6 |
| 5,567,000 A | 10/1996 | Clare | 296/37.6 |
| 5,615,922 A * | 4/1997 | Blanchard | 296/37.6 |
| 6,499,795 B2 | 12/2002 | Clare | 296/183 |
| 6,729,514 B1 * | 5/2004 | Delgado | 224/404 |
| 6,957,847 B2 * | 10/2005 | Rigel | 296/190.02 |

* cited by examiner

*Primary Examiner*—Dennis H Pedder
*Assistant Examiner*—Melissa A Black
(74) *Attorney, Agent, or Firm*—Connolly Bove Lodge & Hutz LLP

(57) ABSTRACT

A truck is disclosed including a stock cab, a stock truck bed and a stock truck frame with these components mismatched to provide a space between the cab and the bed for a enclosed storage assembly extending as a box laterally across the truck and enclosed to the frame. The box includes doors to either side and neither the box nor the doors extend above the top of the sidewalls of the truck bed. The box may include a pivotally mounted top. A mounting assembly enclosely attaches the box to each longitudinal beam of the truck frame. The assembly includes a tab to mount to a mounting point on the truck frame. A J-bolt is associated with a bracket on the assembly and extends to a hole in the truck frame to engage the hole in tension. A locating tab is on the other side of the assembly from the J-bolt to cooperate with the J-bolt to laterally locate the mounting assembly on the frame.

10 Claims, 20 Drawing Sheets

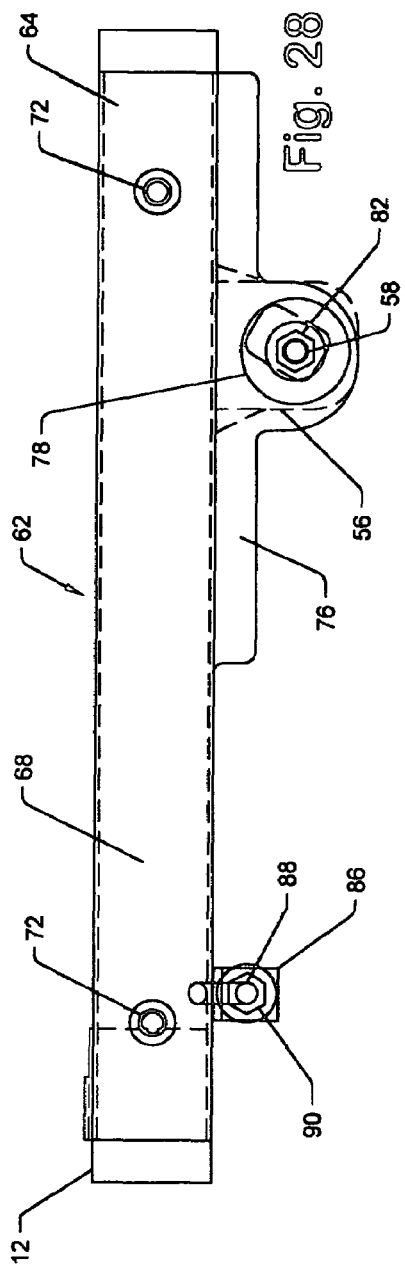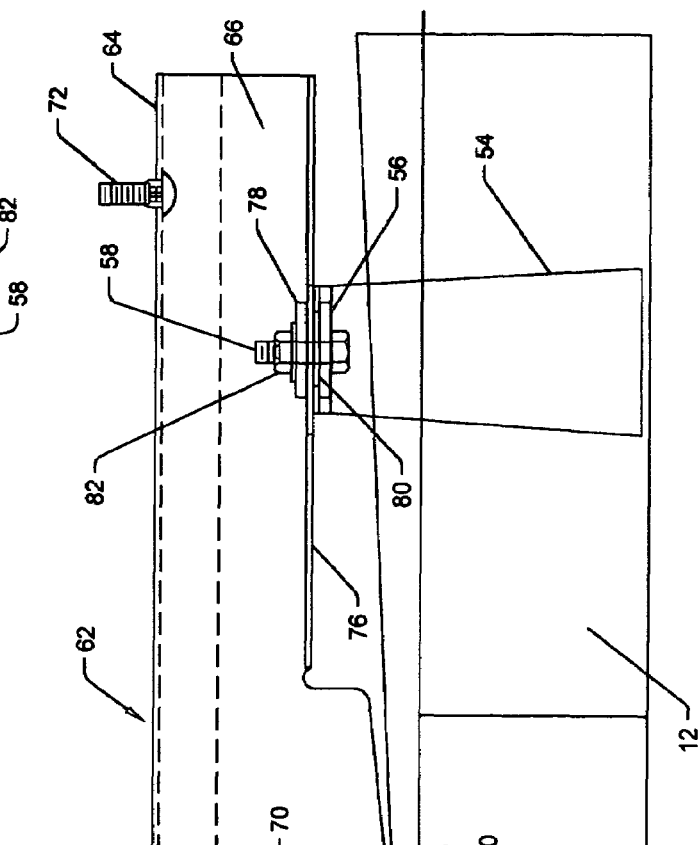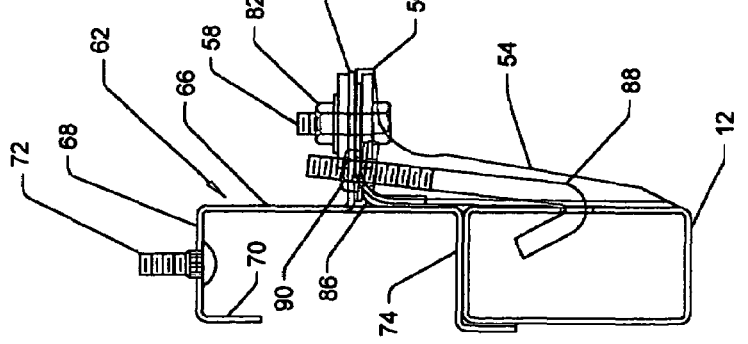

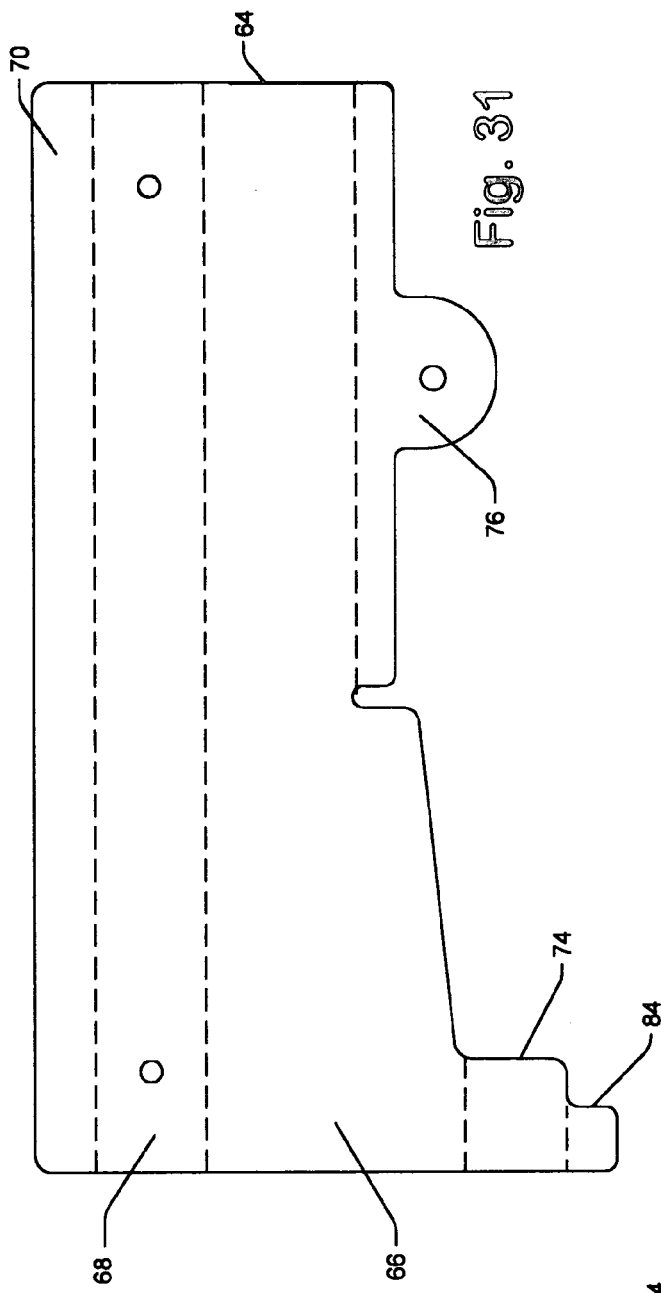
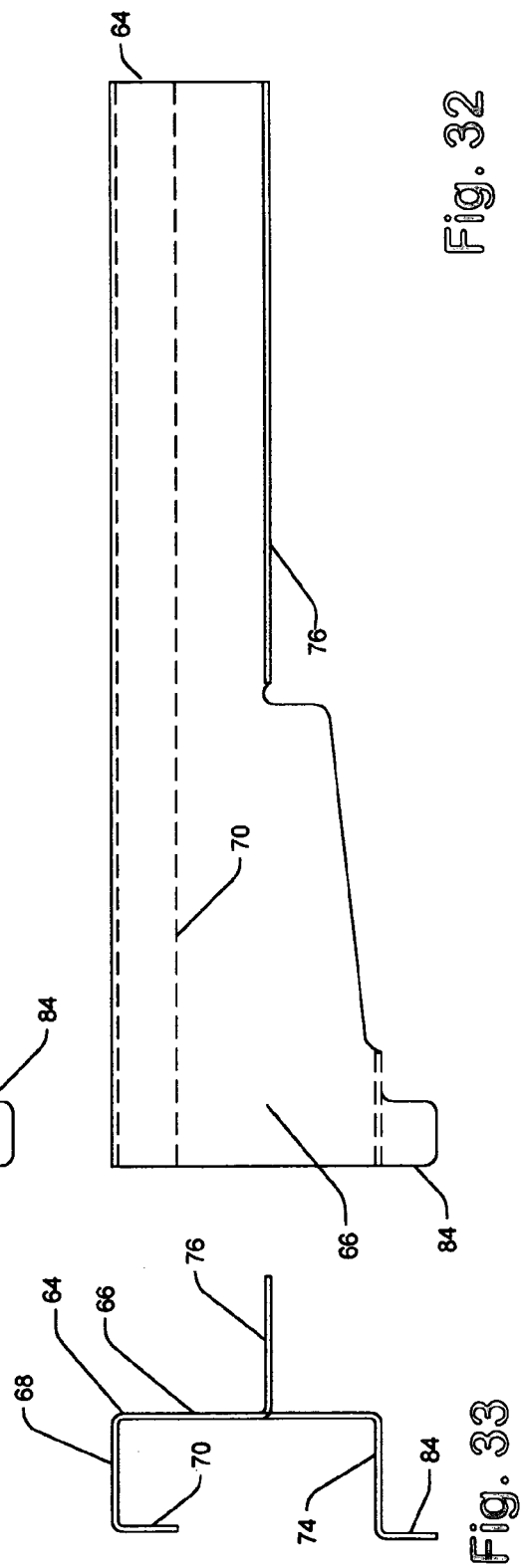

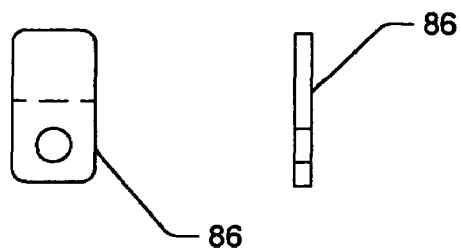
Fig. 34
Fig. 35
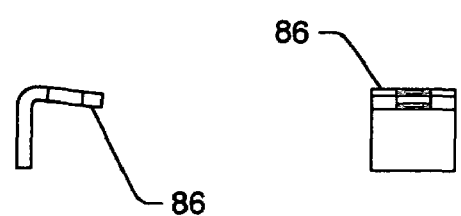
Fig. 36
Fig. 37
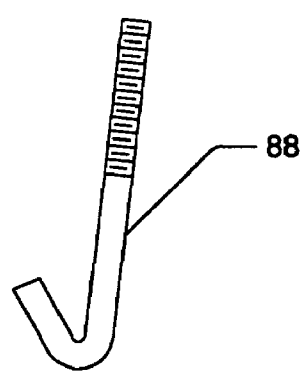
Fig. 38
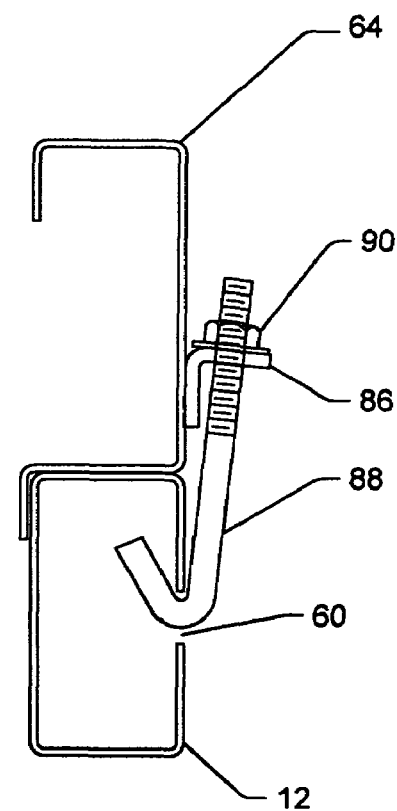
Fig. 39

ENCLOSED STORAGE FOR TRUCKS

CLAIM OF PRIORITY

This application claims priority from U.S. Provisional Application Ser. No. 60/527,267, Filed Dec. 5, 2003, the disclosure of which is incorporated herein by reference.

BACKGROUND OF THE INVENTION

The field of the present invention is enclosed storage boxes employed with trucks.

Trucks having an open bed are typically employed for hauling a great variety of things. In this they offer substantial utility and convenience. However, it is often desirable to carry tools and other valuable or vulnerable items which are easily conveyed by the truck but which are inconvenient or impossible to store in the cab of the truck. Consequently, a need has long existed for enclosed storage on such trucks.

Enclosed storage modules have long been available for such trucks in at least partial satisfaction of that need. The locations have varied for placement of the modules. Such enclosed storage has been positioned between the cab and the bed such as disclosed in U.S. Pat. No. 5,316,358, in the bed such as disclosed in U.S. Pat. No. 5,118,414, and in externally accessible portions of the cab such as disclosed in U.S. Pat. No. 4,917,430. The disclosures of these patents are incorporated herein by reference.

There is a great diversity of need regarding such enclosed storage. Some uses would admit of a large cavity while others would suggest drawers, for example. Vehicle manufacturers provide a limited number of stock items to insure low cost vehicle production. With regard to pickup trucks, there are stock cab sizes available for a given vehicle frame. Such would include a regular cab, a crew cab and a cab with a small utility seat behind the driver. The same is true for stock pickup truck beds. Effectively, they come in different lengths to match the cab on the stock vehicle frame. Further, stock vehicle frames of different lengths are also available.

Enclosed storage on pickup trucks typically requires compatibility with the truck. For example, enclosed storage outside the cab can take up space otherwise available in the truck bed. Camper shells and covers designed to mate with such pickup beds are also typically incompatible with the provision of enclosed storage such as providing drawers within the truck bed.

SUMMARY OF THE INVENTION

The present invention is directed to enclosed storage and its association with a truck.

In a first separate aspect of the present invention, a enclosed storage box is interposed between a conventionally mounted stock pickup bed and a stock pickup cab mounted on a mismatched stock vehicle frame.

In a second separate aspect of the present invention, a storage box includes doors laterally positioned on the truck to open outwardly without interference with the space above the enclosed storage box.

In a third separate aspect of the present invention, a mounting system closely attaches a enclosed storage box to the truck frame without modification of the truck frame.

In a fourth separate aspect of the present invention, any of the foregoing separate aspects may be combined to added advantage.

A principal object of the present invention is to provide an improved enclosed storage box and truck layout therefor.

Other and further objects and advantages will appear hereinafter and in the annotated drawings.

BRIEF DESCRIPTION OF THE DRAWINGS

FIG. 28 is a plan view of a mounting assembly for a enclosed storage box.

FIG. 29 is a front view of the mounting assembly of FIG. 28.

FIG. 30 is an end view of the mounting assembly of FIG. 28.

FIG. 31 is a sheet layout of the mount of the mounting assembly of FIG. 28 with the dotted lines indicating locations for bending.

FIG. 32 is a side view of the mount of FIG. 31.

FIG. 33 is an end view of the mount of FIG. 31.

FIG. 34 is a sheet layout of a mounting bracket employed with the mounting assembly of FIG. 28.

FIG. 35 is an edge view of the sheet layout of FIG. 34.

FIG. 36 is a side view of the mounting bracket of the mounting assembly of FIG. 28.

FIG. 37 is a front view of the mounting bracket of FIG. 36.

FIG. 38 is a side view of a J-bolt employed in the mounting assembly of FIG. 28.

FIG. 39 is an end view of the mounting assembly of FIG. 28 illustrating the J-bolt attachment.

DETAILED DESCRIPTION OF THE PREFERRED EMBODIMENTS

Figure 1:
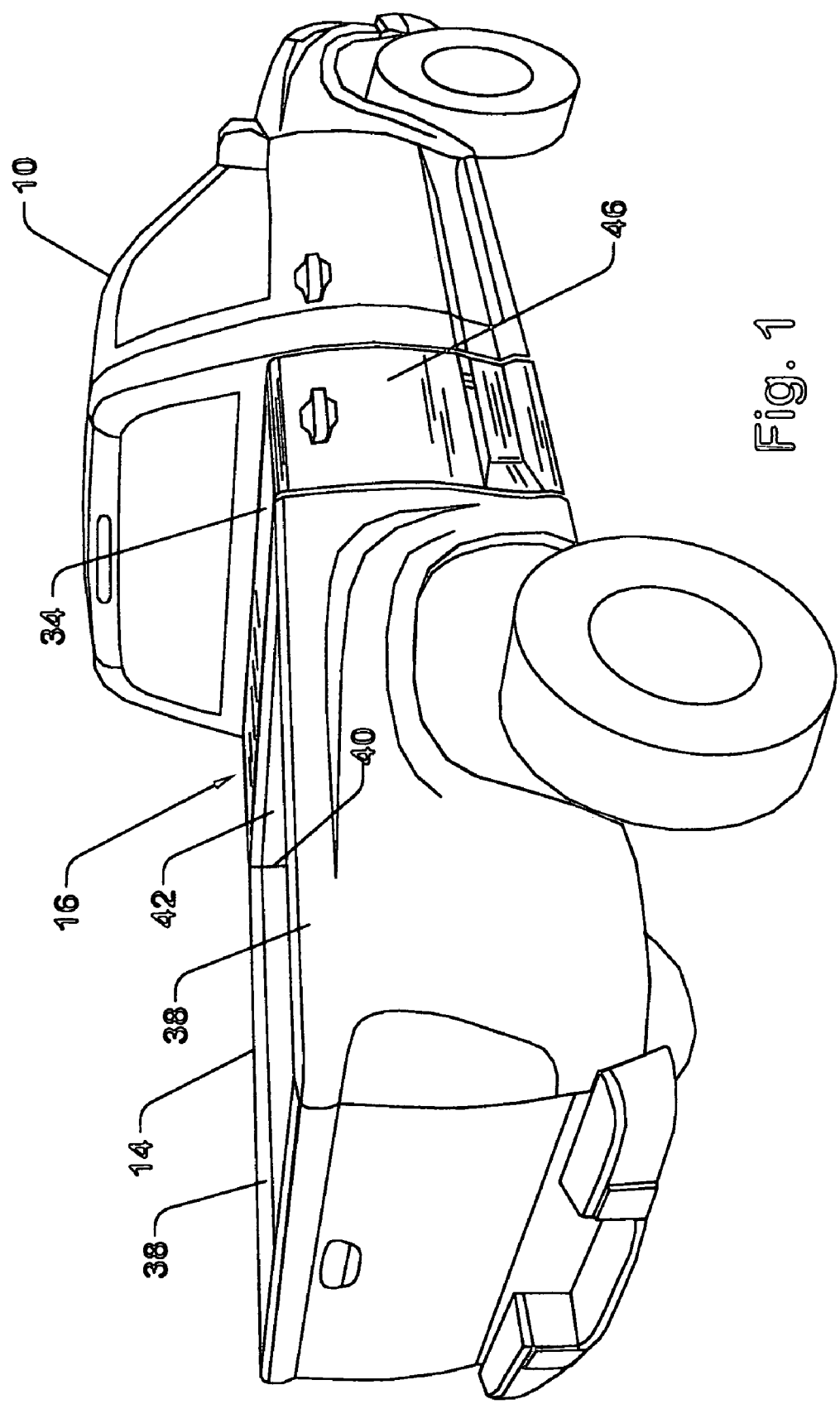
FIG. 1 is a perspective view of a truck with a enclosed storage box.
Figure 2:
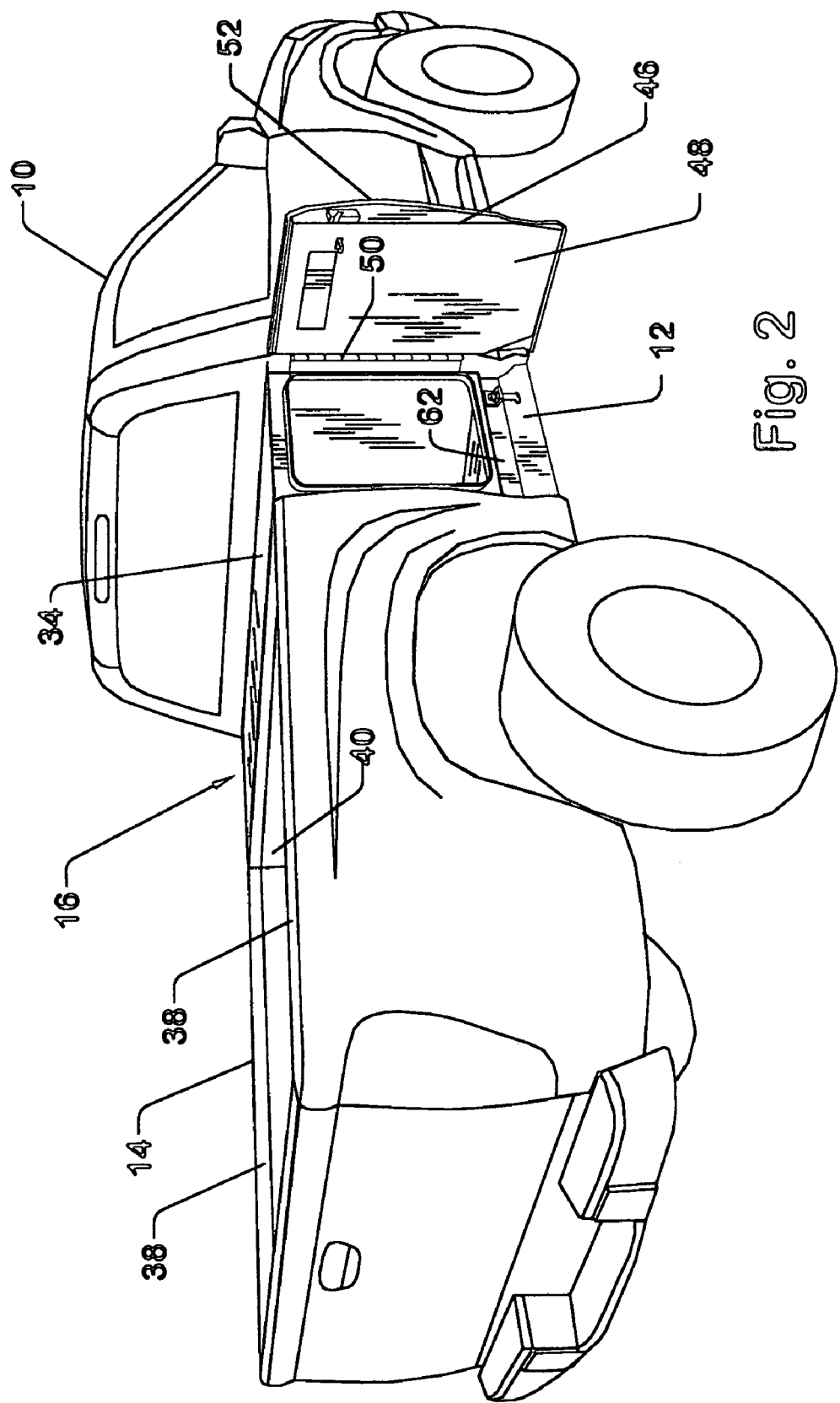
FIG. 2 is a perspective view of the truck of FIG. 1 with a door ajar on the enclosed storage box.
Figure 3:
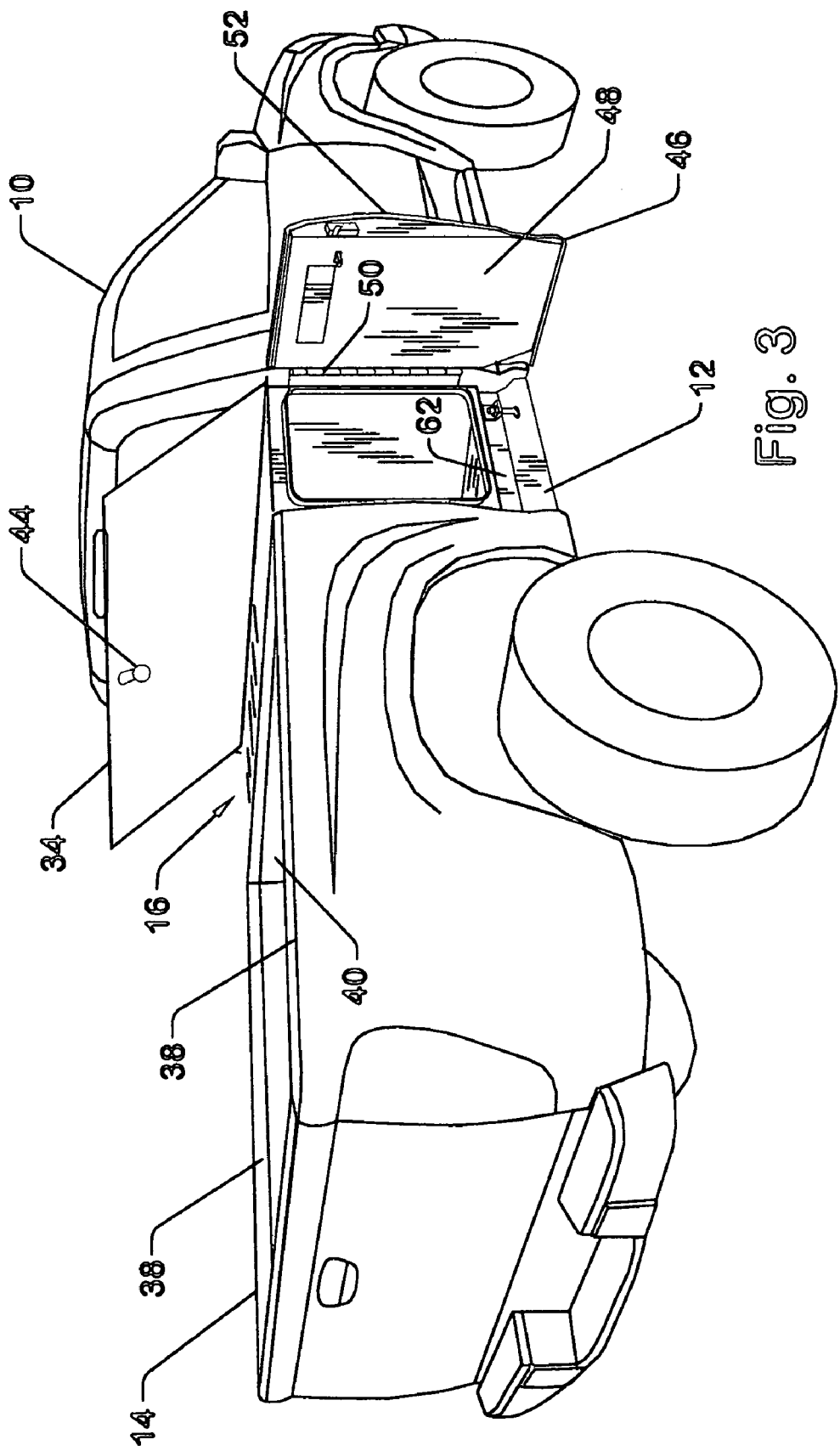
FIG. 3 is a perspective view of the truck of FIG. 1 with a hinged top open.
Figure 4:
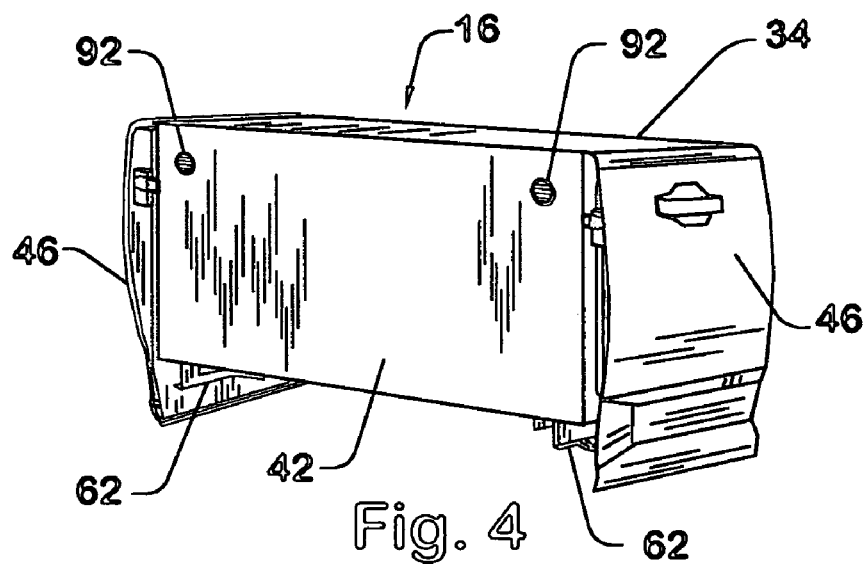
FIG. 4 is a perspective view of the enclosed storage box of FIG. 1.
Figure 5:
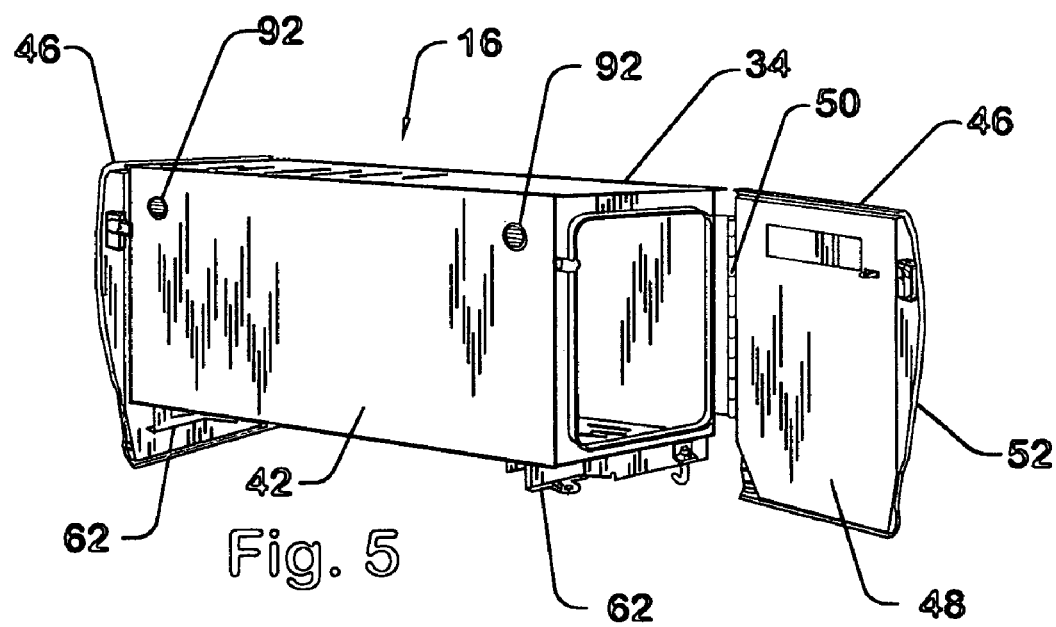
FIG. 5 is a perspective view of the enclosed storage box of FIG. 1 with the door ajar.

Turning in detail to the drawings, pickup trucks are illustrated in FIGS. 1 through 3 and 9 through 17. The trucks are conventional in their supporting structure with stock pickup cabs 10 supported on conventional truck frames 12, illustrated in FIGS. 28 through 30. Truck beds 14 are also substantially conventional with the vehicle frames 12, the cabs 10 and the beds 14 being stock subassemblies from any one of several truck manufacturers. The truck bed 14 is contemplated in the truck illustrated in FIGS. 1 through 3 to have conventional sidewalls 38 and a front wall 40. Spaces extending fully across the vehicles are provided between the cabs 10 and the beds 14. The vehicle frames 12 extend beneath these spaces. Enclosed storage systems, generally designated 16, are located within the spaces between the cabs 10 and the truck beds 14 on the vehicle frames 12.

These spaces are created using stock truck components through the mismatch of a stock vehicle frame employed conventionally for a truck assembly having either a larger cab or a longer bed or both with either a shorter cab or a shorter bed or both. As various combinations of stock cab, stock bed and stock frame are contemplated by the manufacturer, the stock frames 12 provide conventional mounting points for various cab and truck bed configurations. Consequently, the shorter stock cab 10 or the shorter stock truck bed 14, or both, find attachment points on the frame 12 even with the mismatch of such components to define the space reserved between the cab 10 and the bed 14. Further, for the same reasons, a mounting point is associated with each longitudinal beam of the frame in the area of the space. These mounting points are to conventionally receive a longer cab or a longer truck bed. The mounting points will be discussed in detail below.

Figure 18:
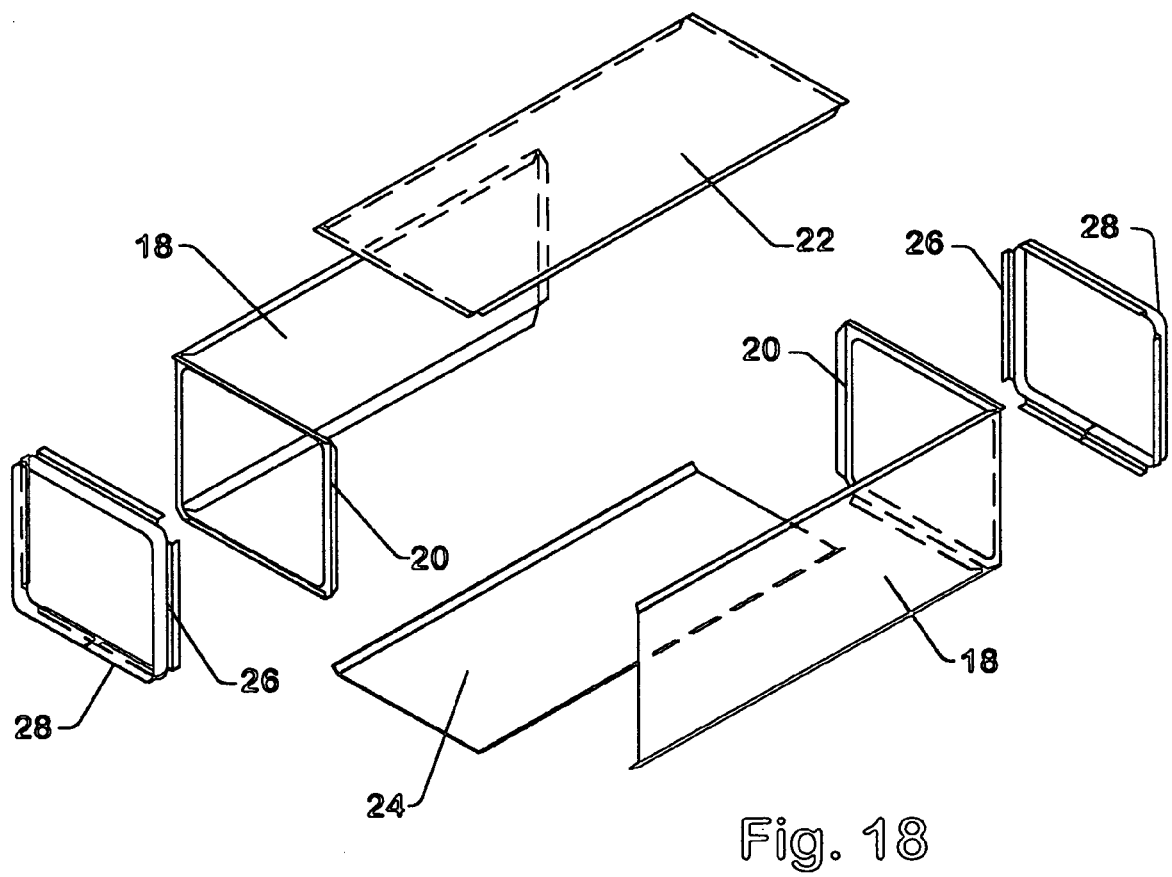
FIG. 18 is a perspective exploded assembly view of the enclosed storage box of FIG. 17.
Figure 19:
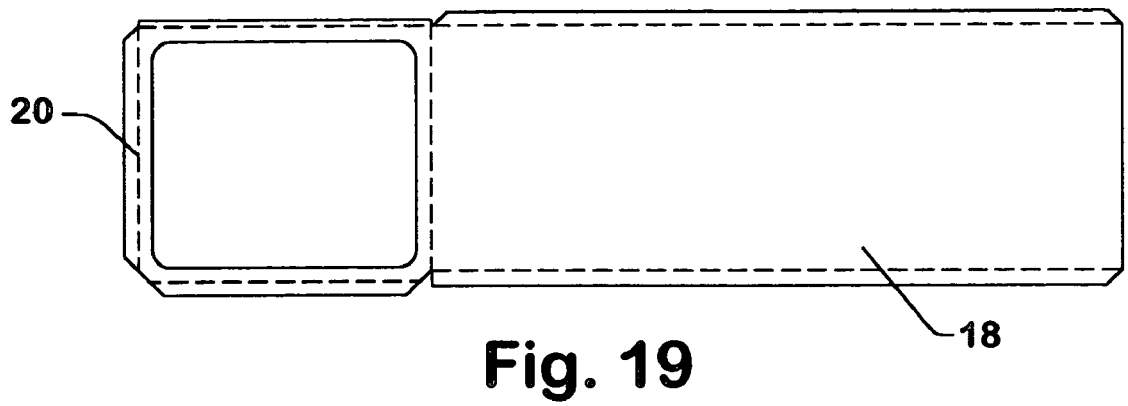
FIG. 19 is a sheet layout of the side and end panel of the enclosed storage box of FIG. 17 with the dotted lines indicating locations for bending.
Figure 20:
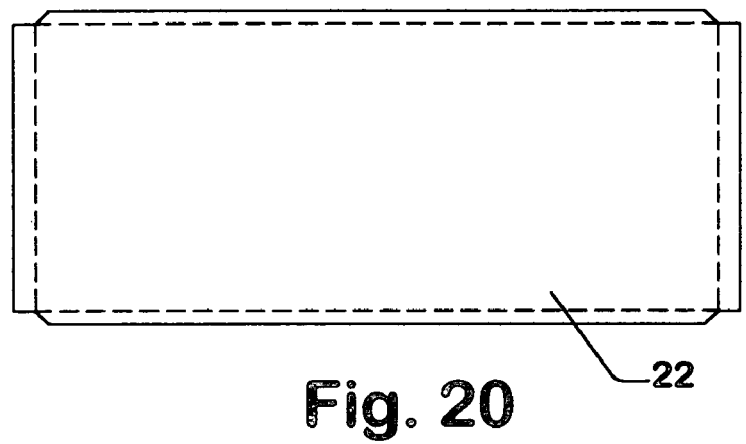
FIG. 20 is a sheet layout of the top panel of the enclosed storage box of FIG. 17 with the dotted lines indicating locations for bending.
Figure 21:
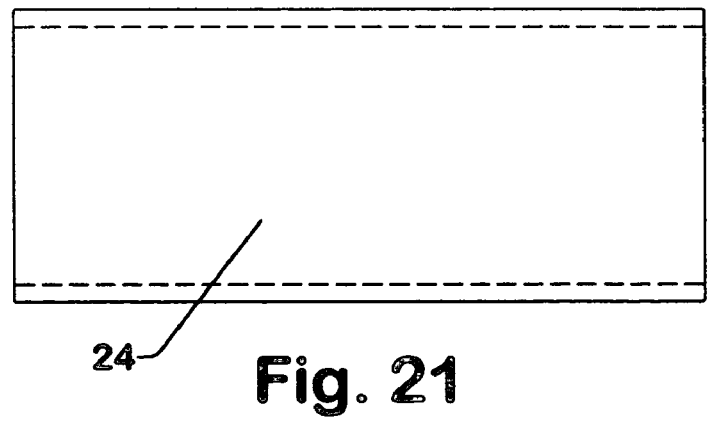
FIG. 21 is a sheet layout of the bottom panel of the enclosed storage box of FIG. 17 with the dotted lines indicating locations for bending.
Figure 22:
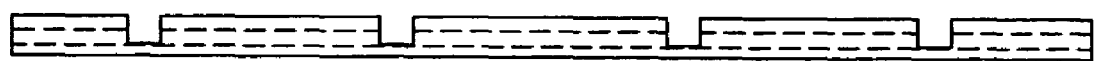
FIG. 22 is a sheet layout of the bezel with the of the enclosed storage box of FIG. 17 dotted lines indicating locations for bending.
Figure 23:
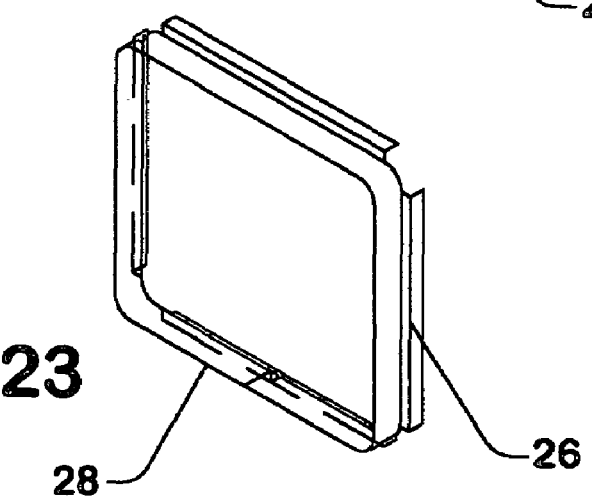
FIG. 23 is a perspective view of the formed bezel of FIG. 22.
Figure 24:
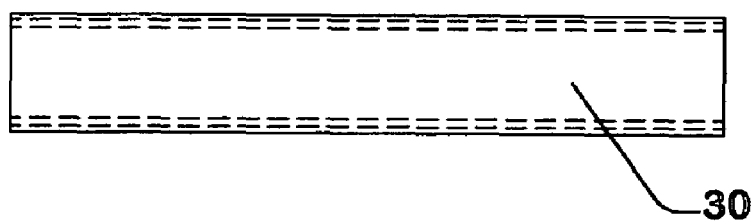
FIG. 24 is a sheet layout of the stiffener of the enclosed storage box of FIG. 17 with the dotted lines indicating locations for bending.
Figure 25:
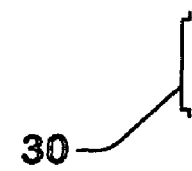
FIG. 25 is an end view of the stiffener of FIG. 24.
Figure 26:
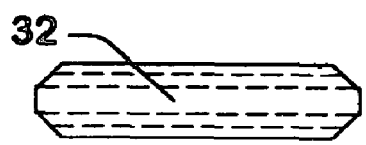
FIG. 26 is a sheet layout of the stiffener of the enclosed storage box of FIG. 17 with the dotted lines indicating locations for bending.
Figure 27:
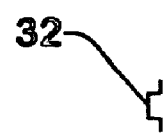
FIG. 27 is an end view of the stiffener of FIG. 26.

FIGS. 17 through 27 show the construction of a simplified embodiment of the system 16. Looking first to this simplified embodiment, FIG. 18 illustrates an exploded assembly view in prospective. Two side members 18 are identically formed with door frames 20. The construction is of conventional 18 gauge sheet metal fabrication. The door frames 20 are arranged at 90° to the side members 18, respectively. Various flanges are employed for later welding of the pieces together. A top 22 and a floor 24 are similarly fabricated and again show bend lines for creating weld flanges. The side members 18, top 22 and bottom 24 form an elongate box 25 with open ends framed by the door frames 20 at each end. These elements are fixed in the assembled state by welding or other fixing techniques in this embodiment. Two weather seal bezels 26 are also fabricated of sheet metal as shown in FIGS. 22 and 23. The forward extending perimeter edge 28 receives a weather seal forming weather stripping. A top stiffener 30, illustrated in FIGS. 24 and 25, is welded to the underside of the top 22. Bottom stiffeners 32 illustrated in FIGS. 26 and 27 are located beneath the floor 24 and extend transversely to the length of the box 25. Three such stiffeners are used in the preferred embodiment.

The enclosed storage system 16 is shown in one embodiment as an assembled unit in FIGS. 4 through 7 with varying sub-features. In the embodiment of FIGS. 1 through 7, the enclosed storage system 16 includes a hinged top 34 employing a piano hinge 36 along the side of the enclosed storage system 16 most adjacent the pickup cab 10. The hinged top 34 with a piano hinge and a latch are variations on the simplified embodiment of FIGS. 17 through 27. A latch 44 retains the top 34 closed against a sidewall 42. Thus, the hinged top 34 can be pivoted up about a horizontal axis at one edge of the box 25 adjacent the cab 10.

Doors 46 are pivotally mounted about vertical axes to the enclosed storage box 25 in each embodiment. Each door 46 is defined by an inner flat panel 48 which is mounted by a hinge 50 to the door frame 20. The panel 48 pivots to press against the weather seal positioned on the edge 28 of the bezel 26. A door skin 52 mounts on the flat panel 48 to effect an aesthetic transition between the cab 10 and the truck bed 14. A door handle like the stock door handle on the truck may be employed for the doors 46 and operate the same way.

The location of the enclosed storage box 25 in the space provided between the cab 10 and the truck bed 14 is shown to fit with a clearance between the cab 10 and the bed 14. This clearance is such as to be advantageous for assembly of the box 25 with the truck and further to accommodate the assembly tolerances of the truck. The box 25 and the doors 46 are also designed so as not to extend above the sidewalls 38 of the truck bed 14, with the doors closed or open. Further, the doors 46 swing laterally of the frame in operation to avoid interference with the area above the top 22 or 34.

The enclosed storage box 25 mounts between the cab 10 and the bed 14 to the frame 12 of the truck. By employing a shorter cab 10 or shorter truck bed 14 than conventionally matched with the frame 12, a mount 54 is exposed on each of the longitudinal beams defining the frame 12. Each mount 54 is closely affixed to the frame 12 and extends to a mounting bracket 56 accommodating a mounting bolt 58. A hole 60 is found to be included in the frame through each of the longitudinal beams of the frame 12. The hole 60 is displaced along the longitudinal beam from the mounting bracket 56.

Two mounting assemblies securely mount the enclosed storage box 25 to the two longitudinal beams of the frame 12. Each mounting assembly takes advantage of the existing mounting bracket 56 and hole 60 to effect a secured attachment. The mounting assembly, generally designated 62, includes a mount body 64.

The mount body 64 includes a vertically extending plate 66. The plate 66 has an upper horizontally extending edge and a lower edge that has a profile to accommodate varying utility. A mounting flange 68 extends horizontally from the upper edge of the plate 66 to define an upper mounting surface. For strength, a stiffening flange 70 extends downwardly from the mounting flange 68 at an edge of the mounting flange displaced from the plate 66, as illustrated in FIG. 30. Bolts 72 extend upwardly to engage with the enclosed storage box 25. The storage box 25 has holes in either the floor 24 or the bottom stiffeners 32 with nuts to receive the threaded bolts 72.

A support flange 74 extends from a portion of the bottom edge of the plate 66 to define a bottom able to rest upon the upper surface of the longitudinal beam of the frame 12. The mounting flange 68 and the support flange 74 are shown to be substantially parallel with one above the other. A mounting tab 76 extends outwardly from the plate 66 in a direction opposite to the mounting flange 68 and the support flange 74. This mounting tab 76 includes a hole for receipt of the mounting bolt 58. A conventional washer 78 and a noise isolating washer 80 sandwich the mounting tab 76 with a bolt 82 retaining the mount body 64 on the bolt 82 on the mounting bracket 56.

A locating tab 84 depends from the support flange 74 at the opposite side of the support flange 74 from its intersection with the plate 66. The locating tab abuts against the inner side of the longitudinal beam of the frame 12 as can be best illustrated in FIGS. 28 through 30.

An angle bracket 86 is welded to the plate 66 to form an anchor for a J-bolt 88. The anchor 86 is aligned such that the J-bolt 88 can extend to the hole 60 to engage the frame 12. The bracket 86 is on the opposite side of the mounting assembly 62 from the locating tab 84. The bracket 86 may conveniently be somewhat inclined to the horizontal so as to accommodate the angled arrangement of the J-bolt 88 as it engages the hole 60. This arrangement is best illustrated again in FIGS. 28 through 30. A nut 90 allows tension to be drawn in the J-bolt 88 to insure rigid placement of the mounting assembly 62.

Additional sub-features of the enclosed storage box 25 can add to its utility. The folding nature of the hinged top 34 and pivotally mounted side 42 has been described. By collapsing these two elements into the interior of the box 25, in conjunction with the opening 40 in the front of the truck bed 14, the length of the bed 14 is extended by substantially the width of the box 25. Thus, even though a smaller bed 14 is employed so as to accommodate the box 25, the effect of an extended bed can be realized. The hinged top 34 may also open upwardly for convenient access to the interior of the box 25. Vent holes 92 are arranged in the side 18, 42.

Figure 6:
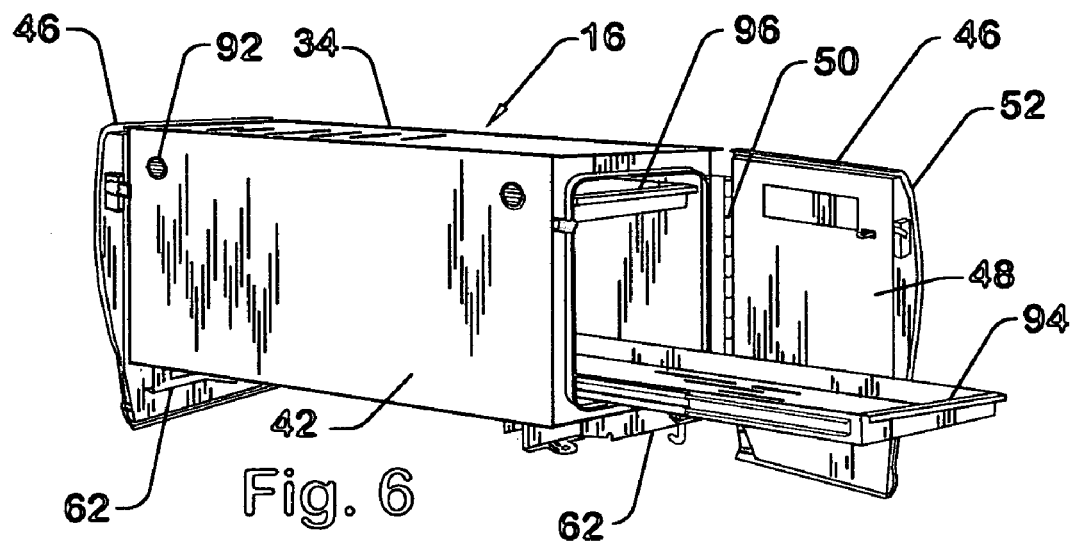
FIG. 6 is a perspective view of the enclosed storage box of FIG. 1 containing sliding supports therein.
Figure 7:
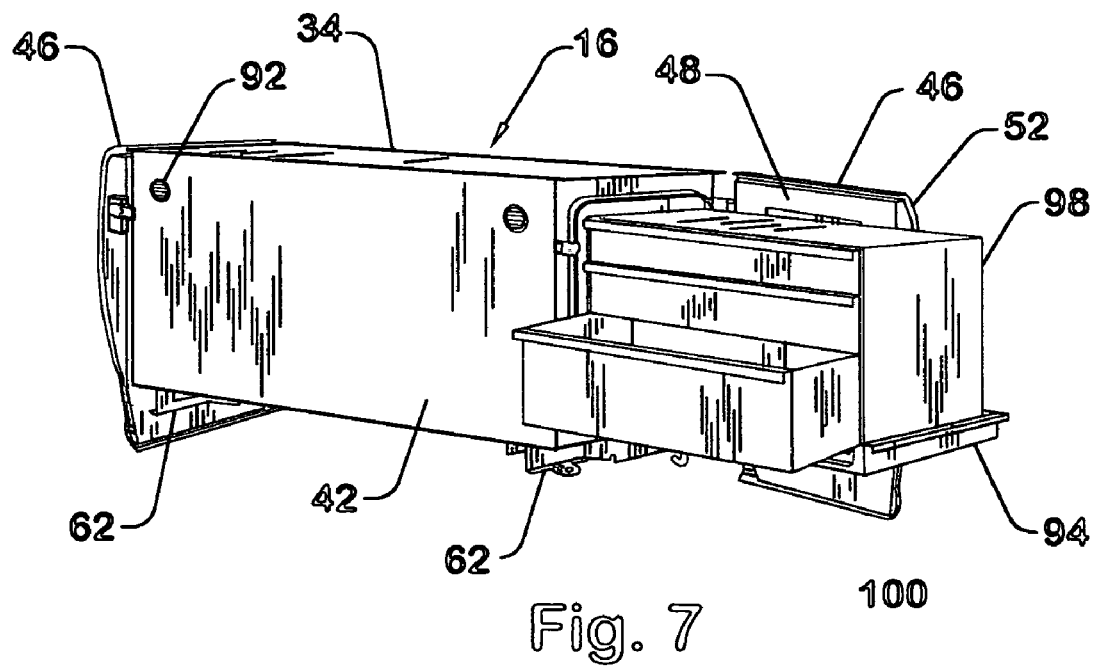
FIG. 7 is a perspective view of the hinged storage box of FIG. 1 with a drawer module containable therein on sliding supports.
Figure 8C:
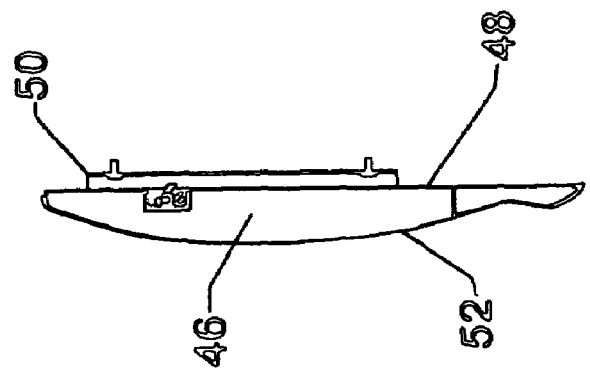
FIG. 8 is a front view and two orthographic edge views of the door.
Figure 8A:
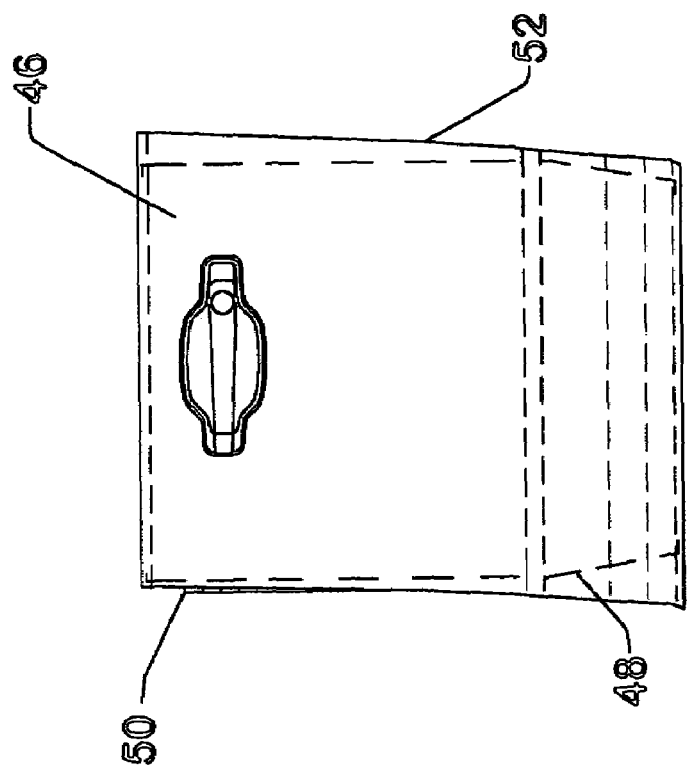
Figure 8B:
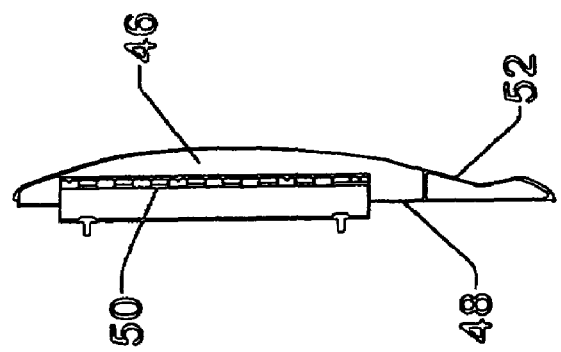
Figure 9:
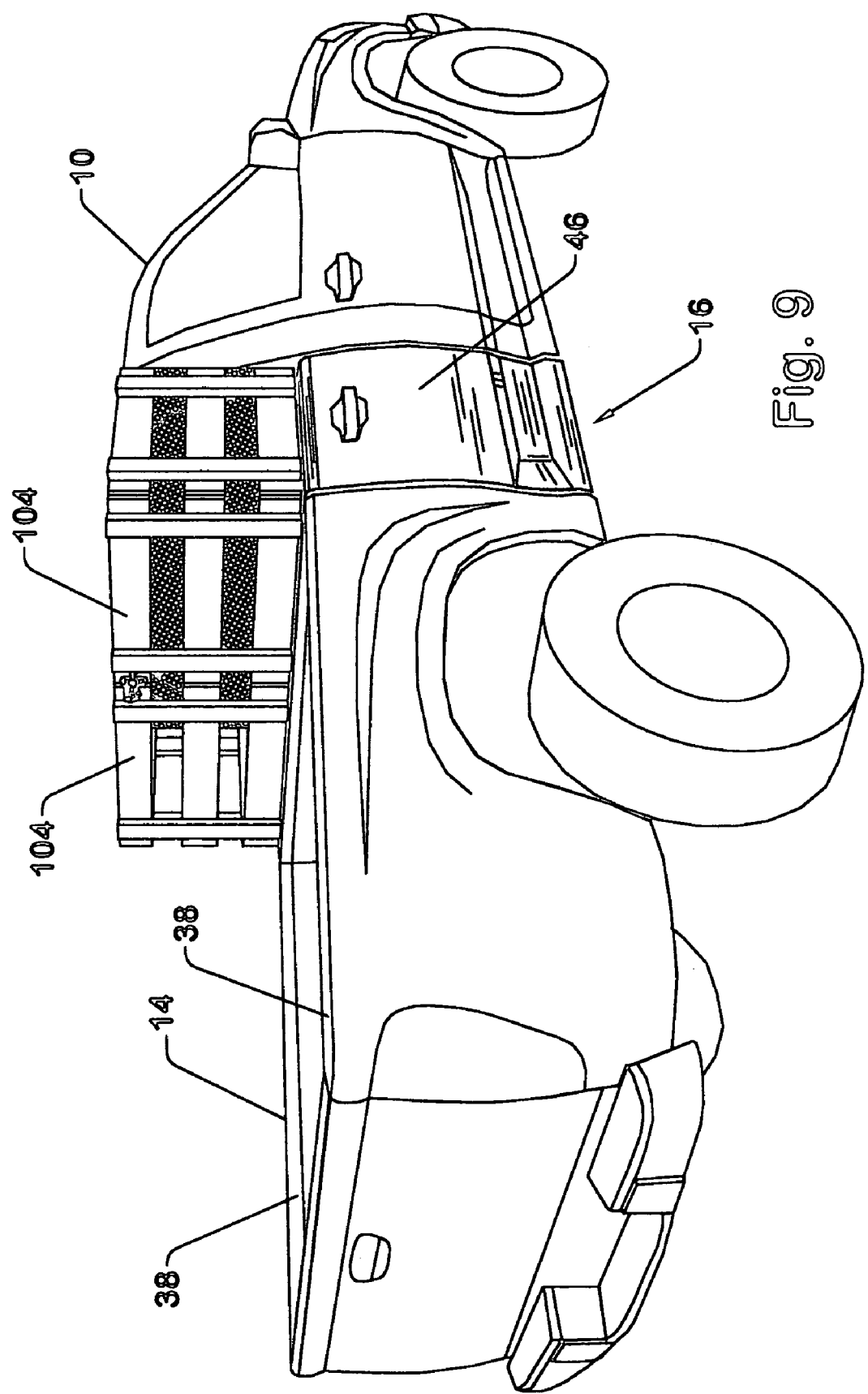
FIG. 9 is a perspective view of a truck with stakes on the enclosed storage box.
Figure 10:
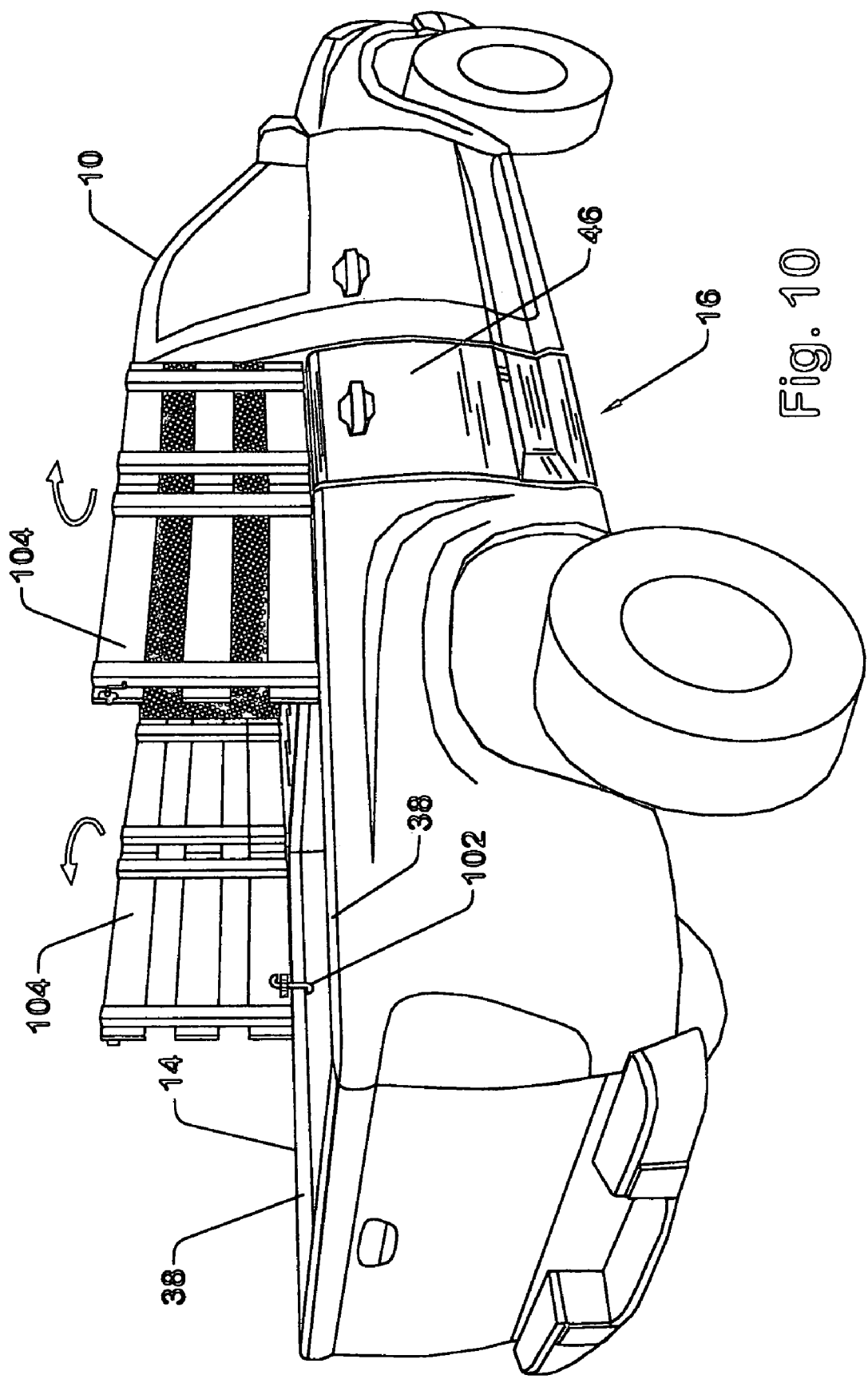
FIG. 10 is a perspective view of the truck of FIG. 9 with the gates of the stake bed open.
Figure 11:
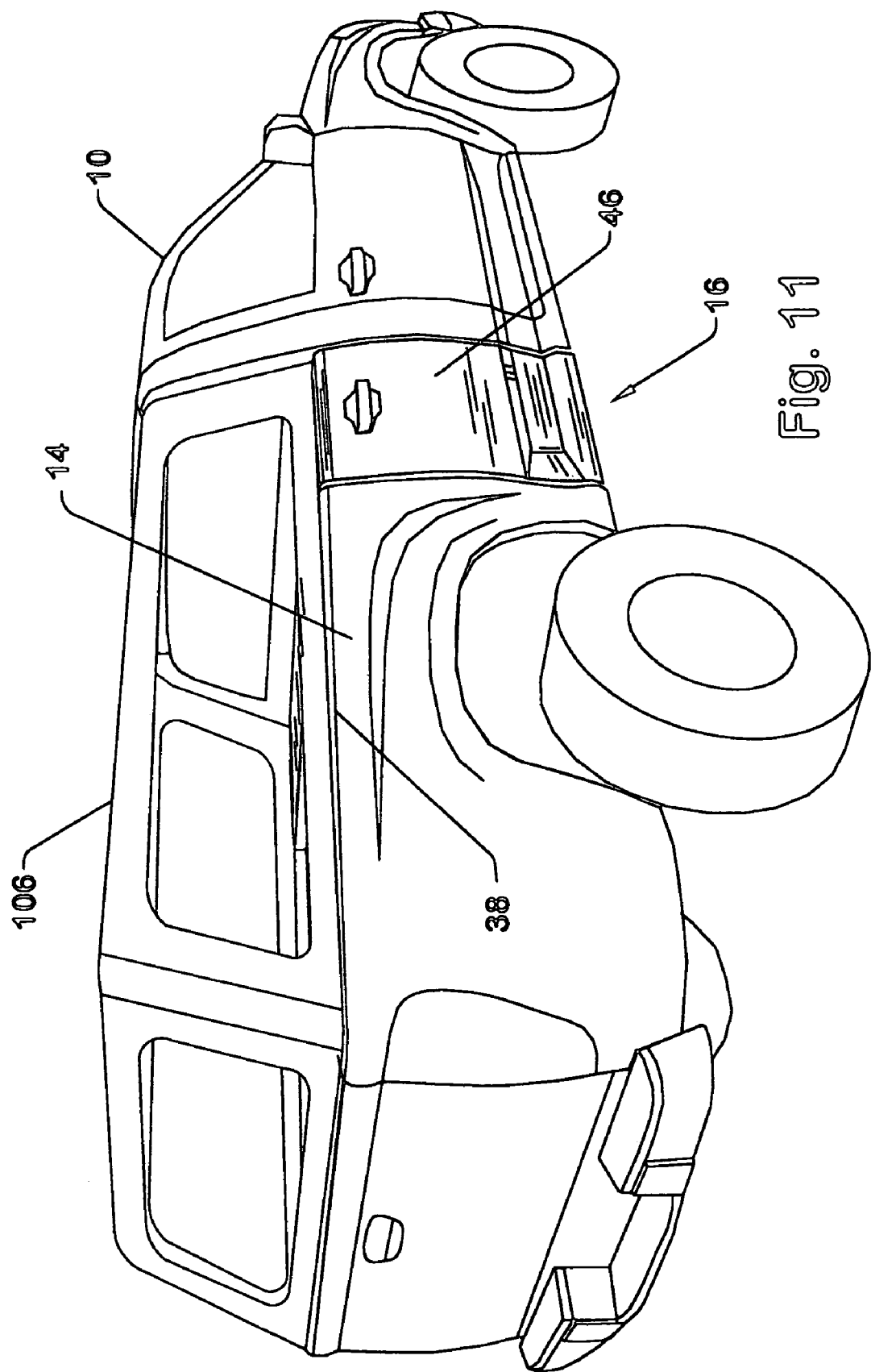
FIG. 11 is a perspective view of a truck with the enclosed storage box and a camper top.

FIG. 6 illustrates a rollout floor 94 and an upper pullout drawer 96 of conventional operation. FIG. 7 illustrates the employment of a drawer module 98 with drawers 100 which may be accommodated on the rollout floor 94. FIG. 9 illustrates a use of the upper surface, or top 22, with a stake truck configuration. As illustrated in FIG. 10, the stake assembly includes gates which can swing to alignment with the sidewalls 38 of the truck bed 14. Tie-down hooks 102 enclose the gates 104 in the orientation with the sidewalls 38. FIG. 11 illustrates the placement of a commercial camper top 106 over the truck bed 14 and enclosed storage box 25. This placement is facilitated by the box 25 and the doors 46 not extending upwardly beyond the full extent of the sidewalls 38 of the bed 14.

Figure 12:
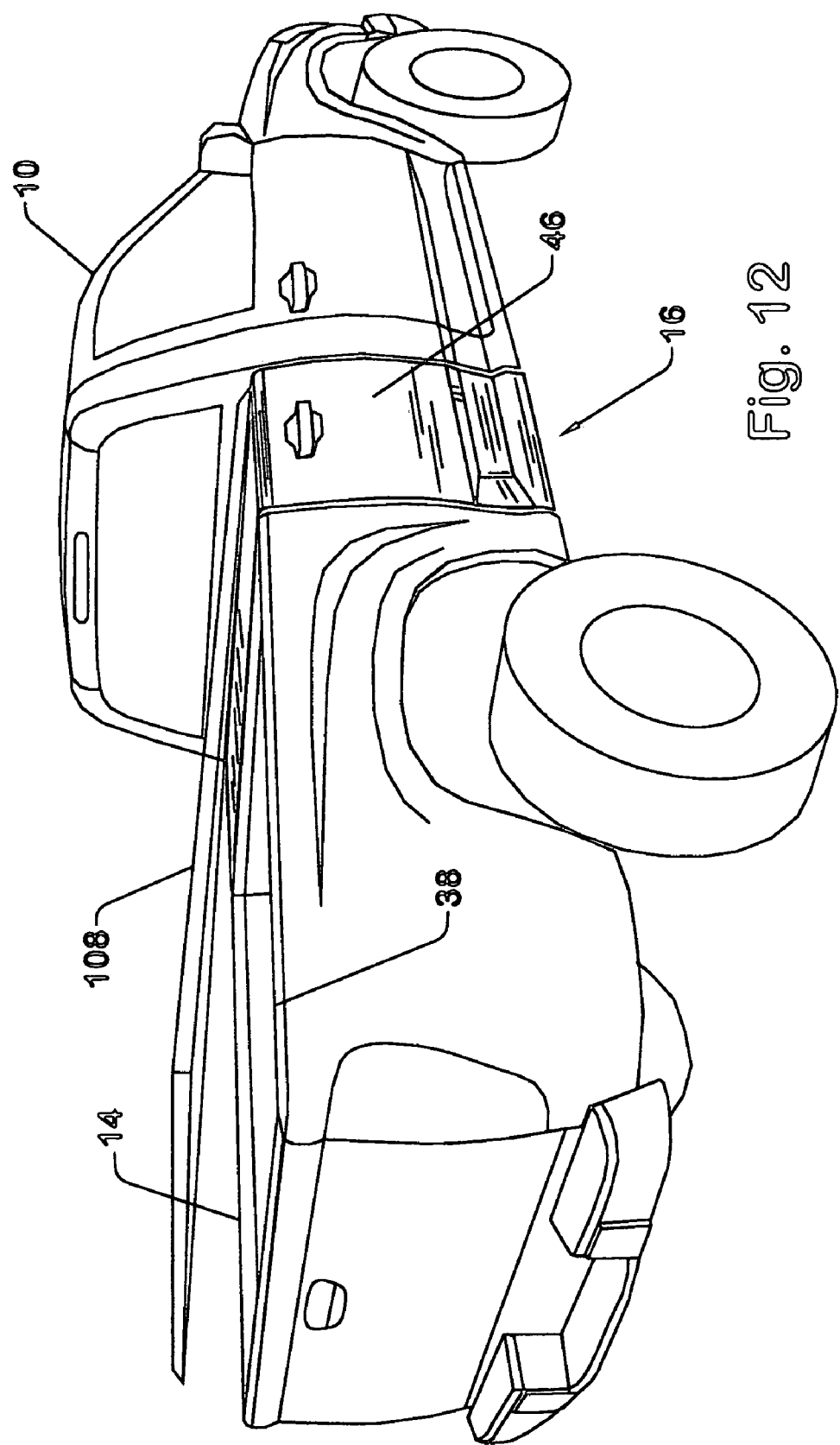
FIG. 12 is a perspective view of a truck with the enclosed storage box and a tonneau cover.
Figure 13:
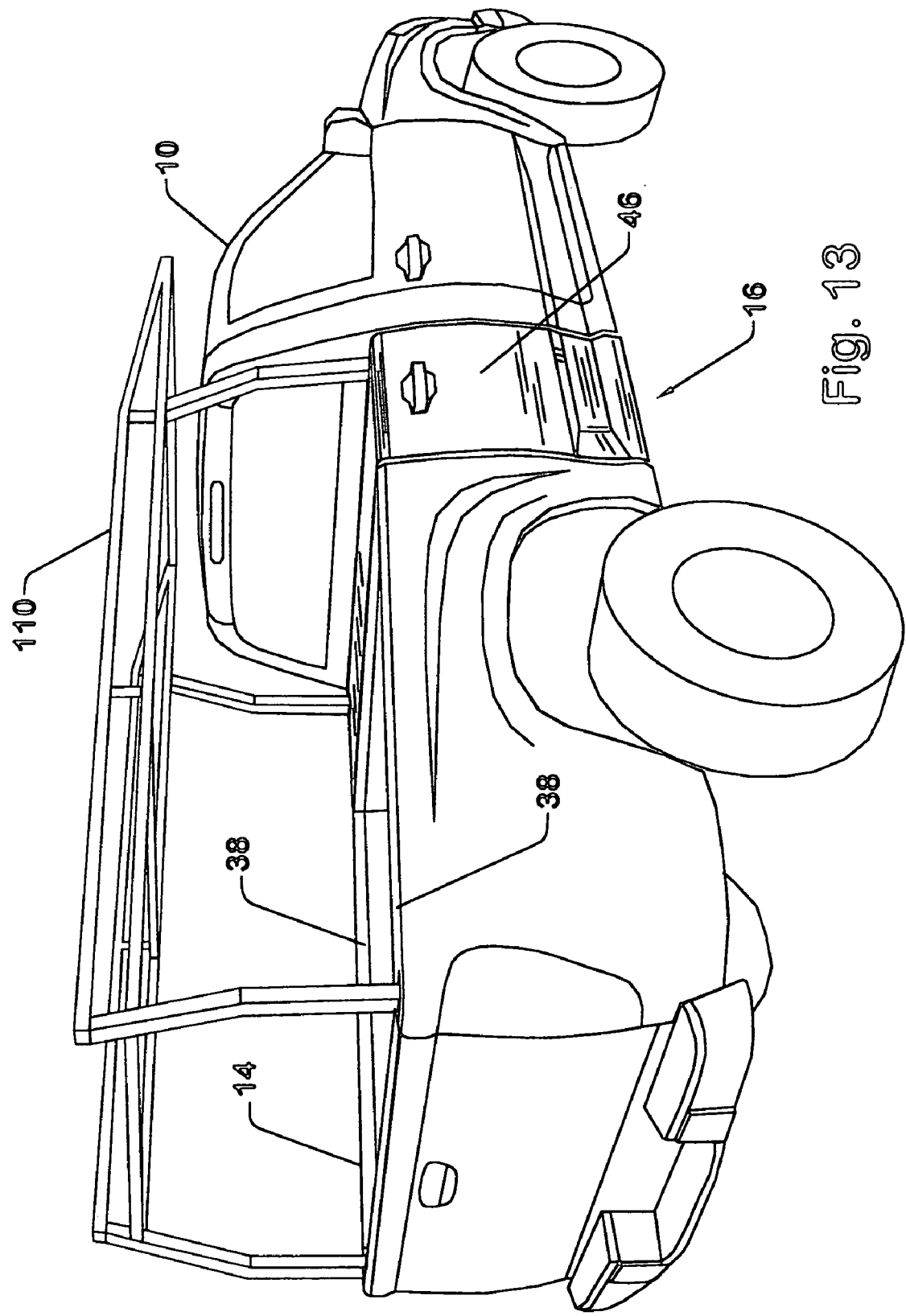
FIG. 13 is a perspective view of a truck with the enclosed storage box and an above-cab ladder rack.
Figure 14:
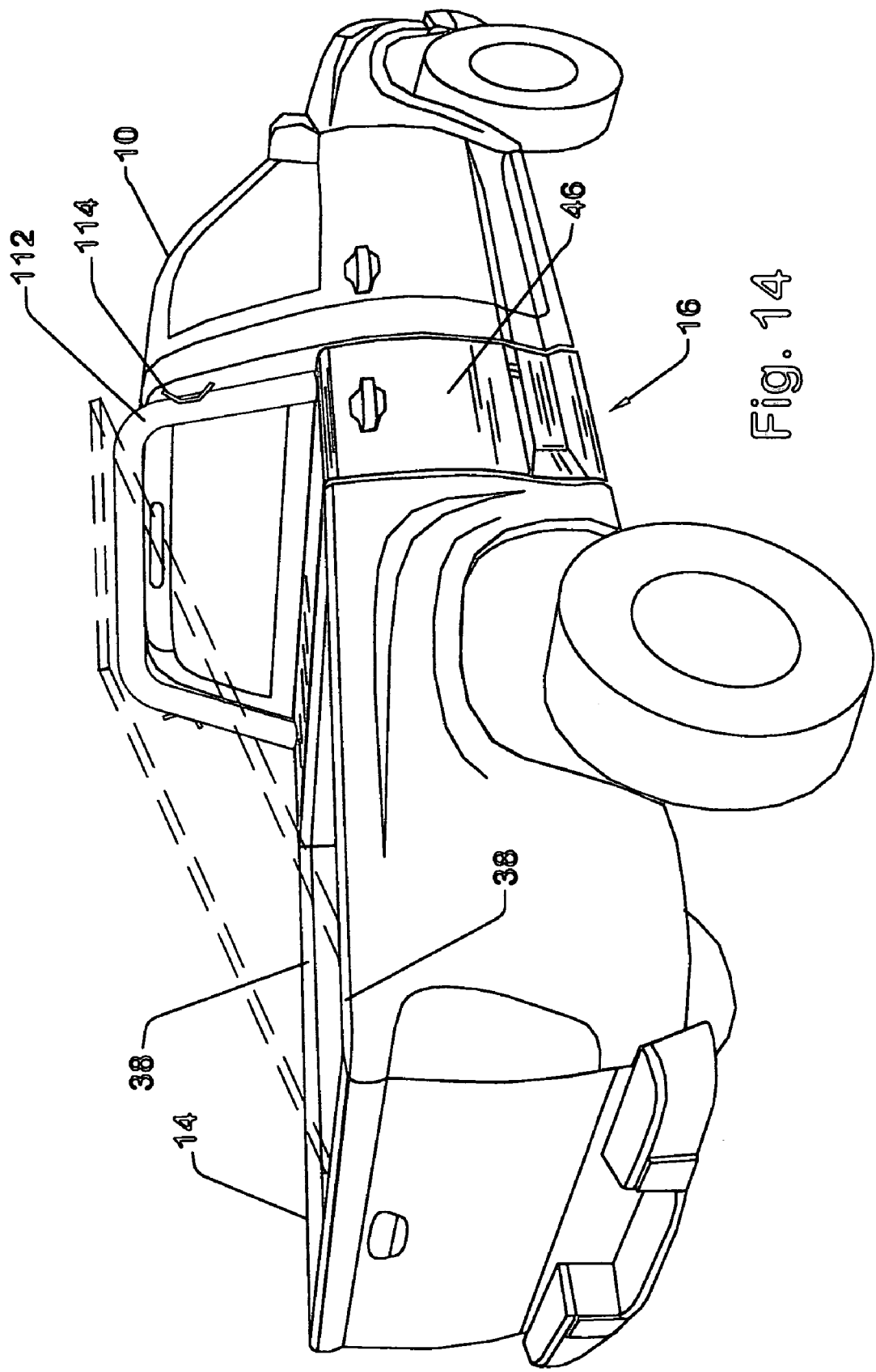
FIG. 14 is a perspective view of a truck with the enclosed storage box and a roll bar with tie-down cleats.
Figure 15:
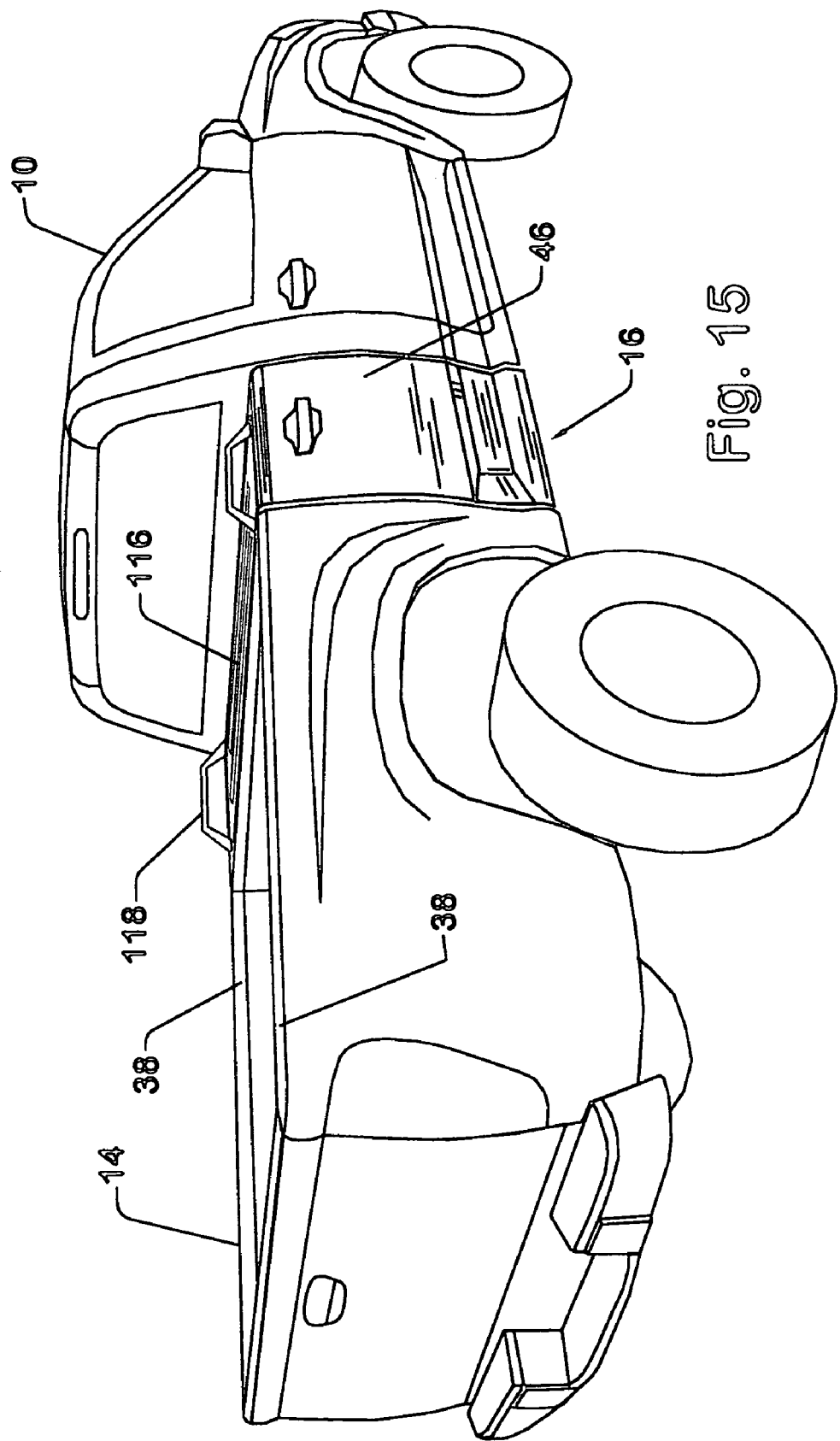
FIG. 15 is a perspective view of a truck with the enclosed storage box including luggage-type racks and traction strips.
Figure 16:
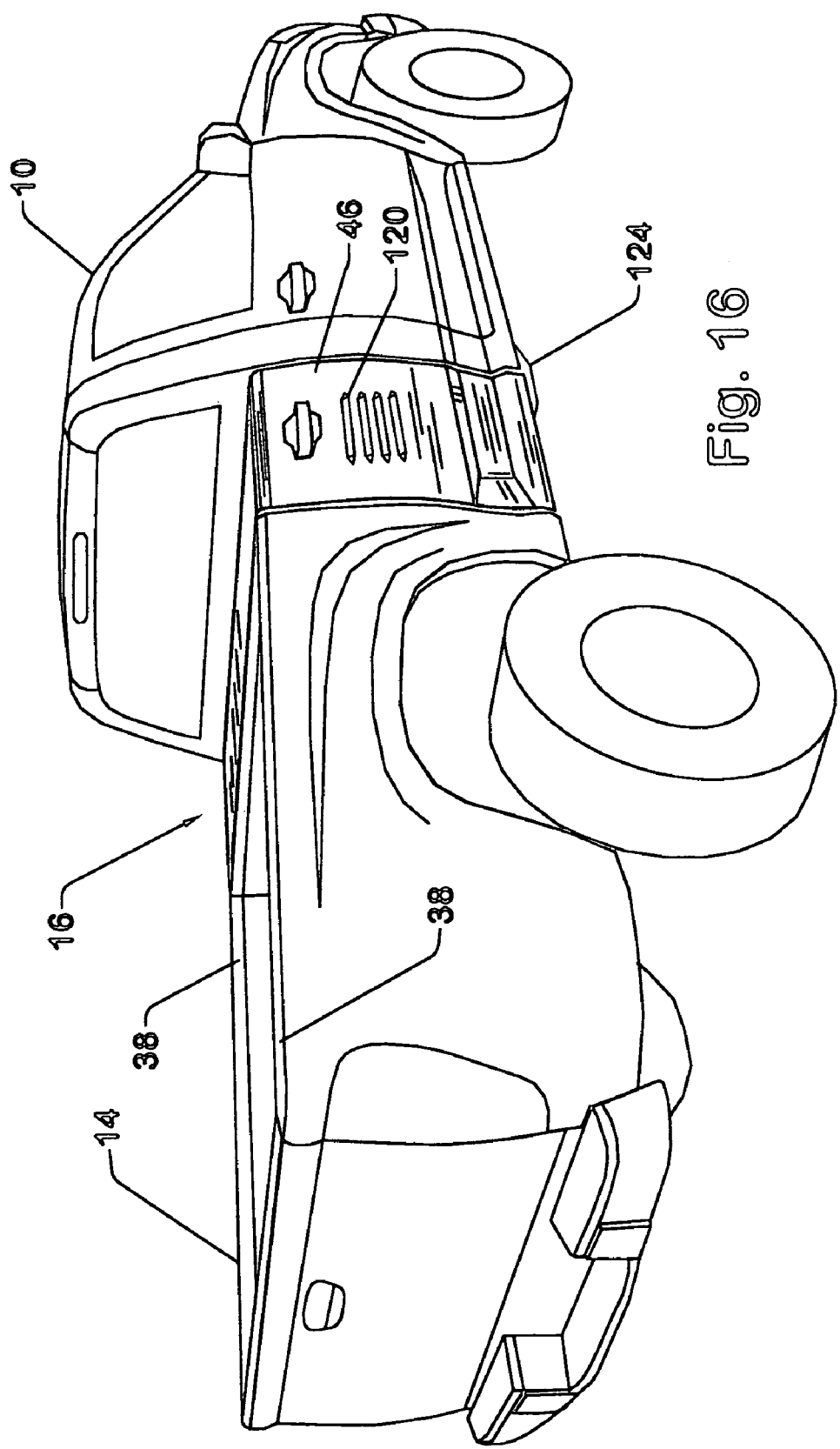
FIG. 16 is a perspective view of a truck with the enclosed storage box having louvers, heating and stainless steel double wall construction.
Figure 17:
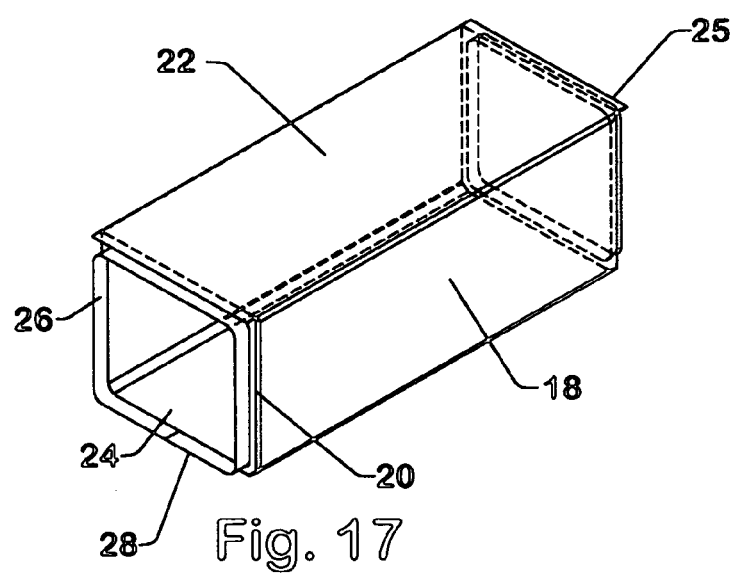
FIG. 17 is a perspective view of a enclosed storage box.

In FIG. 12, a commercial tonneau cover 108 is also accommodated by the storage box 25. A commercial above-cab ladder rack 110 is illustrated in FIG. 13 where sockets are included in the sidewalls 38 and the storage box 25. Similarly, a roll bar 112 with tie-down cleats 114 may be accommodated by including holes through the top 22. The roll bar 112 would also extend to attachment to the frame 12 if the bar is intended for structural support in the event of a rollover. FIG. 15 shows an option with traction strips 116 and luggage racks 118 for additional load carrying capacity on top of the box 25. FIG. 16 illustrates a box 25 with additional ventilating louvers 120 in the doors 46. Additionally, double stainless steel wall construction may be employed for insulation in this configuration along with a heating duct 124 from the cab for use by small animal handlers.

Thus, a highly useful and versatile enclosed storage system is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A truck comprising
a truck frame;
a pickup bed mounted to the frame;
a pickup cab mounted to the frame;
an enclosed storage box between the pickup bed and the pickup cab mounted to the frame;
a mounting assembly including a mount body, a mounting tab extending laterally of the mount body, a locating tab depending from the mount body and a J-bolt bolted to the mount body, the frame including a longitudinal beam having a hole on one side of the beam and a mounting bracket displaced along the beam from the hole, the mounting tab engaging the mounting bracket, the mount body being positioned on top of and extending along the beam, the J-bolt extending to engage the hole with the J-bolt in tension and the locating tab abutting the other side of the beam, the enclosed storage box being positioned on top of the mount body.

2. The truck of claim 1, the mount body having a plate forming one side of the mount body, a mounting flange extending from the plate along a first edge of the plate to define an upper surface of the mount body and a support flange extending from the plate along a second edge of the plate to define a bottom of the mount body, the mounting flange being displaced from the support flange, the mounting tab extending from the plate along a second edge of the plate and displaced from the mounting flange, the locating tab extending from the support flange along one edge of the support flange and displaced from the second edge.

3. The truck of claim 2, the mount body further having a stiffening flange extending from the mounting flange along one edge thereof displaced from the plate.

4. A truck comprising
a frame including a longitudinal beam having a hole on one side of the beam and a mounting bracket displaced along the beam from the hole;
a mounting assembly including a mount body, a mounting tab extending laterally of the mount body, a locating tab depending from the mount body and a J-blot bolted to the mount body, the mounting tab engaging the mounting bracket, the mount body being positioned on top of and extending along the beam, the J-bolt extending to engage the hole with the J-bolt in tension and the locating tab abutting the other side of the beam.

5. The truck of claim 4, the mount body having a plate forming one side of the mount body, a mounting flange extending from the plate along a first edge thereof to define an upper surface of the mount body and a support flange extending from the plate along a second edge thereof to define a bottom of the mount body, the mounting flange being displaced from the support flange, the mounting tab extending from the plate along a second edge of the plate and displaced from the mounting flange, the locating tab extending from the support flange along one edge of the support flange and displaced from the second edge.

6. The truck of claim 5, the mount body further having a stiffening flange extending from the mounting flange along one edge of the mounting flange displaced from the plate.

7. The truck of claim 4 further comprising
a pickup cab on the frame;
a pickup bed on the frame and including sidewalls;
an enclosed storage box positioned on top of the mount body between the cab and the bed and including a top and at least one door pivotally mounted about a vertical axis to swing laterally of the truck frame, the enclosed storage box not extending above the sidewalls of the pickup bed.

8. A mounting assembly for a frame including a longitudinal beam having a hole on one side of the beam and a mounting bracket displaced along the beam from the hole, comprising
a mount body;
a mounting tab extending laterally of the mount body;
a locating tab depending from the mount body;
a J-bolt bolted to the mount body, the mounting tab engaging the mounting bracket, the mount body being positioned on top of and extending along the beam, the J-bolt extending to engage the hole with the J-bolt in tension and the locating tab abutting the other side of the beam, the enclosed storage box being positioned on top of the mount body.

9. The mounting assembly of claim 8, the mount body having a plate forming one side of the mount body, a mounting flange extending from the plate along a first edge of the plate to define an upper surface of the mount body and a support flange extending from the plate along a second edge of the plate to define a bottom of the mount body, the second edge being displaced from the first edge at the support flange, the mounting tab extending from the plate along a second edge of the plate, the mounting flange being displaced from the support flange, the locating tab extending from the support flange along one edge of the support flange and displaced from the second edge.

10. The mounting assembly of claim 9, the mount body further including a stiffening flange extending from the mounting flange along one edge of the mounting flange and displaced from the plate.

* * * * *

UNITED STATES PATENT AND TRADEMARK OFFICE
CERTIFICATE OF CORRECTION

| | | |
|---|---|---|
| PATENT NO. | : 7,219,941 B1 | Page 1 of 1 |
| APPLICATION NO. | : 11/002815 | |
| DATED | : May 22, 2007 | |
| INVENTOR(S) | : San Paolo et al. | |

It is certified that error appears in the above-identified patent and that said Letters Patent is hereby corrected as shown below:

In Claim 4 (Col. 6, l. 53), delete "J-blot" and insert therefore -- J-bolt --.

Signed and Sealed this

Tenth Day of July, 2007

JON W. DUDAS
*Director of the United States Patent and Trademark Office*